United States Patent
Yoshida

(10) Patent No.: US 8,036,295 B2
(45) Date of Patent: Oct. 11, 2011

(54) RADIO COMMUNICATION SYSTEM THAT USES A MIMO RECEIVER

(75) Inventor: Shousei Yoshida, Minato-ku (JP)

(73) Assignee: NEC Corporation, Tokyo (JP)

( * ) Notice: Subject to any disclaimer, the term of this patent is extended or adjusted under 35 U.S.C. 154(b) by 1341 days.

(21) Appl. No.: 11/441,199

(22) Filed: May 26, 2006

(65) Prior Publication Data
US 2006/0268963 A1  Nov. 30, 2006

(30) Foreign Application Priority Data
May 31, 2005  (JP) ................................. 2005-159070

(51) Int. Cl.
H04B 7/02 (2006.01)
H04B 1/00 (2006.01)
H04L 27/06 (2006.01)

(52) U.S. Cl. ............................ 375/267; 375/340; 455/63

(58) Field of Classification Search .................. 375/267, 375/340
See application file for complete search history.

(56) References Cited

U.S. PATENT DOCUMENTS

| 5,784,415 A | 7/1998 | Chevillat et al. | |
|---|---|---|---|
| 2003/0026349 A1* | 2/2003 | Onggosanusi et al. | 375/267 |
| 2003/0139139 A1* | 7/2003 | Onggosanusi et al. | 455/63 |
| 2004/0170233 A1* | 9/2004 | Onggosanusi et al. | 375/340 |
| 2005/0053172 A1* | 3/2005 | Heikkila | 375/333 |
| 2006/0018410 A1* | 1/2006 | Onggosanusi et al. | 375/340 |
| 2008/0075148 A1* | 3/2008 | Li et al. | 375/148 |

FOREIGN PATENT DOCUMENTS

| JP | 9-506747 A | 6/1997 |
|---|---|---|
| JP | 11-298954 A | 10/1999 |
| JP | 2001-267986 A | 9/2001 |
| JP | 2002-44051 A | 2/2002 |
| JP | 2002-64407 A | 2/2002 |
| JP | 2003-134094 A | 5/2003 |
| JP | 2004-72566 A | 3/2004 |
| JP | 200488767 A | 3/2004 |
| JP | 2004165784 A | 6/2004 |
| JP | 2004-282472 A | 10/2004 |
| JP | 2005-45329 A | 2/2005 |
| JP | 2005-65197 A | 3/2005 |

(Continued)

OTHER PUBLICATIONS

Truan et al, "Application of QR Decomposition to Design of Sapce-Time Codes for MIMO System"; 10th Asia PacificConference on Communications and 5th INternation Symposium on Multi-Dimension Mobile Communications. Sep. 2004, pp. 26-29.*

(Continued)

*Primary Examiner* — Shuwang Liu
*Assistant Examiner* — Sarah Hassan
(74) *Attorney, Agent, or Firm* — Sughrue Mion, PLLC

(57) ABSTRACT

A receiver uses a transmission channel matrix to obtain a superior signal separation characteristic regardless of differences in levels of multipath signals. A multipath linear combining unit performs linear combining of the multipaths in received signals of the reception antennas by means of the transmission channel matrix between the plurality of transmission antennas and the plurality of reception antennas. A maximum likelihood detector compares signals in which multipaths have been combined by the multipath linear combining unit with reception replicas that have been found using the transmission channel matrix to estimate the transmitted signals of each of the transmission antennas.

12 Claims, 12 Drawing Sheets

FOREIGN PATENT DOCUMENTS

| JP | 4322918 B2 | 9/2009 |
|---|---|---|
| WO | 03050968 A2 | 6/2003 |
| WO | 2004010572 A1 | 1/2004 |

OTHER PUBLICATIONS

Le, "Application of QR decomposition to Design of Space-Time Codes for MIMO Systems" publsiehd Sep. 2004.*

Higuchi et al, "Performance Comparisons Between OFDM and DS-CDMA Radio Access Using MIMO Multiplexing in Multi-path Fading Channels," IEICE Technical Report, Jan. 21, 2005, pp. 1-11, vol. 104, No. 599, Institute of Electronics, Information and Communication Engineers (IEICE), Minato-Ku, Tokyo, Japan.

Kawamoto et al, "Comparison of QRM-MLD Employing Multipath Interference Canceller on Throughput and Computational Complexity in Broadband DS-CDMA", Technical Report of IEICE, Jul. 9, 2004, pp. 1-10, vol. 104, No. 186, Institute of Electronics, Information and Communication Engineers (IEICE), Minato-ku, Tokyo, Japan.

Adjoudani, et al., "Prototype Experience for MIMO BLAST over Third-Generation Wireless System," IEEE J. Select. Areas Commun., vol. 21, No. 3, pp. 440-451, Apr. 2003.

N. Maeda, et al., "QRM-MLD Combined with MMSE-Based Multipath Interference Canceller for MIMO Multiplexing in Broadband DS-CDMA," Proc. IEEE PIMRC 2004, pp. 1741-1746, Sep. 2004.

* cited by examiner

RADIO COMMUNICATION SYSTEM THAT USES A MIMO RECEIVER

BACKGROUND OF THE INVENTION

1. Field of the Invention

The present invention relates to a receiver, a receiving method, and a radio communication system that are used in communication realized by MIMO, and more particularly to a receiver, a receiving method, and a radio communication system in which MIMO signals are demodulated by means of maximum likelihood detection (MLD) from signals that are received using a plurality of reception antennas.

2. Description of the Related Art

Radio communication methods in next-generation mobile communication demand high-speed data transmission. MIMO (Multiple Input Multiple Output) multiplexing is receiving attention as a technology for realizing high-speed data transmission. MIMO is a technology for transmitting a plurality of signals from a plurality of transmission antennas at the same frequency and the same time, receiving these signals using a plurality of reception antennas, and then demodulating (implementing signal separation of) the plurality of signals.

FIG. 1 is a block diagram showing the configuration of a typical radio communication system that uses MIMO. In this case, the number of transmission antennas is M (where M is an integer equal to or greater than 1), and the number of reception antennas is N (where N is an integer equal to or greater than 1).

Referring to FIG. 1, the radio communication system includes transmitter 81 and receiver 82. Transmitter 81 has a plurality of transmission antennas $83_1$-$83_M$, and receiver 82 has a plurality of reception antennas $84_1$-$84_N$.

Transmitter 81 transmits differing signals from each of a plurality of transmission antennas $83_1$-$83_M$ at the same time and at the same frequency. Receiver 82 uses a plurality of reception antennas $84_1$-$84_N$ to receive the signals that have been transmitted from transmitter 81 and, from these received signals, demodulates M signals by means of a signal separation process. According to this radio communication system, increasing the number of signals that are simultaneously transmitted and received in proportion to the number of transmission antennas enables the realization of high-speed data transmission without increasing the transmission bandwidth.

On the other hand, DS-CDMA (Direct Sequence-Code Division Multiple Access) is widely used as a mobile communication radio access method.

In DS-CDMA, time-spreading a transmission signal by a particular code can effectively reduce the interference of other cells in a multi-cell environment and enable one-cell repetition. In addition, separating multipath signals by means of despreading and then combining these multipath signals (rake combining) can obtain the path diversity effect.

In recent years, the possibility of enabling even higher-speed data transmission through the application of MIMO multiplexing to DS-CDMA (CDMA MIMO multiplexing) is being investigated. Various methods have been proposed as the signal separation process in CDMA MIMO multiplexing, examples including: Minimum Mean Square Error (MMSE), Vertical Bell Labs Layered Space-Time (VBLAST), and Maximum Likelihood Detection (MLD).

MMSE is a method in which interference from transmission antennas other than the target transmission antenna are suppressed by a linear filter. VBLAST is a method in which MMSE and successive interference cancellation of transmission antenna signals are repeated (for example, refer to A. Adjoudani, E. C. Beck, A. P. Burg, G. M. Djuknic, T. G. Gvoth, D. Haessig, S. Manji, M. A. Milbrodt. M. Rupp, D. Samardzija, A. B. Siegel, T. Sizer, H. C. Tran, S. Walker, S. A. Wilkus, and P. W. Wolnianski, "Prototype Experience for MIMO BLAST over Third-Generation Wireless System," IEEE J. Select. Areas Commun., Vol. 21, no. 3, pp. 440-451, April 2003 (Document 1)). MLD is a method of generating replicas of all transmission antenna signals and using these replicas to select the most likely transmission antenna signal.

MLD has superior characteristics to MMSE and VBLAST but has the disadvantage that the increase in the number of transmission antennas and the number of modulation multi-values brings with it an exponential increase in computation load. As a solution to this drawback, a reduced-computation-load MLD is now being investigated that can greatly reduce the MLD computation load.

One example of a prior-art MIMO receiver that uses MLD to perform a CDMA MIMO signal separation process is next shown. FIG. 2 is a block diagram showing the configuration of a MIMO receiver of the prior art. In this case, the number of transmission antennas provided in a transmitter (not shown) is M (where M is an integer equal to or greater than 1), and the number of reception antennas is N (where N is an integer equal to or greater than 1).

Referring to FIG. 2, the MIMO receiver of the prior art includes: reception antennas $91_1$-$91_N$, despreaders $92_{11}$-$92_{1L}$, ... $92_{N1}$-$92_{NL}$, transmission channel estimation unit 93, and MLD unit 94.

Each of despreaders $92_{11}$-$92_{1L}$ despreads a respective path of each signal that is received at reception antenna $91_1$. Similarly, the received signals of each of the reception antennas are despread for each path by L despreaders, each of despreaders $92_{N1}$-$92_{NL}$ despreading the signal received by reception antenna $91_N$ for a respective path. The despread signals that are obtained as a result are provided to MLD unit 94.

In this case, if $y_{n,\,l}$ is the despread symbol of path 1 of reception antenna n, despread symbol vector y can be shown as shown in Equation (1).

$$y = [y_{0,0} \ldots y_{0,L-1} y_{1,0} \ldots y_{N-1,L-1}]^T \quad (1)$$

Transmission channel estimation unit 93 receives as input the signals that have been received at reception antennas $9_{11}$-$91_N$, uses a known pilot signal that is included in these received signals to estimate for each path the transmission channel estimation value between the transmission and reception antennas. If the transmission channel estimation value of path l between transmission antenna m and reception antenna n is $h_{m,n,l}$, then transmission channel matrix H can be represented by (N×L) rows and M columns as seen in Equation (2).

$$H = \begin{bmatrix} h_{0,0,0} & h_{1,0,0} & \ldots & h_{M-1,0,0} \\ \vdots & \vdots & \ddots & \vdots \\ h_{0,0,L-1} & h_{1,0,L-1} & \ldots & h_{M-1,0,L-1} \\ h_{0,1,0} & h_{1,1,0} & \ldots & h_{M-1,1,0} \\ \vdots & \vdots & \ddots & \vdots \\ h_{0,N-1,L-1} & h_{1,N-1,L-1} & \ldots & h_{M-1,N-1,L-1} \end{bmatrix} \quad (2)$$

MLD unit 94 uses transmission channel matrix H that is obtained by transmission channel estimation unit 93 to generate reception replicas for the signals that have been received from all transmission antennas, calculates the error signals between the despread signals from each of despreaders $92_{11}$-

$92_{NL}$ and the reception replicas, and selects the transmission antenna signal that is most likely.

If the transmission symbol vector s is shown in Equation (3), and noise vector n is shown in Equation (4), transmission channel matrix H can be used to represent despread symbol vector y as shown in Equation (5):

$$s = [s_0 \ s_1 \ \ldots \ s_{M-1}]^T \tag{3}$$

$$n = [n_{0,0} \ \ldots \ n_{0,L-1} \ n_{1,0} \ \ldots \ n_{N-1,L-1}]^T \tag{4}$$

$$y = Hs + n \tag{5}$$

In Equation (3), $s_m$ shows the transmission symbol of transmission antenna m. In Equation (4), $n_{n,l}$ shows the noise in path l of reception antenna n.

FIG. 3 is a block diagram showing the configuration of MLD unit 94. Referring to FIG. 3, MLD unit 94 includes: transmission symbol candidate generation unit 941, reception replica generation unit 942, error signal calculation unit 943, and bit likelihood calculation unit 944.

Transmission symbol candidate generation unit 941 generates transmission symbol vector s, which is the combination of all transmission antenna symbols, and sends this transmission symbol vector to reception replica generation unit 942.

Reception replica generation unit 942 generates all reception replicas $\tilde{r}=Hs$ based on transmission symbol vector s from transmission symbol candidate generation unit 941 and transmission channel matrix H, and sends these transmission replicas to error signal calculation unit 943.

Error signal calculation unit 943 finds the final error signal $\Lambda$ based on reception replicas $\tilde{r}$ from reception replica generation unit 942 and despread symbols y from despreaders $92_{11}$-$92_{NL}$, and sends this error signal $\Lambda$ to bit likelihood calculation unit 944. At this time, error signal calculation unit 943 compares reception replica $r_{n,l}$ and despread symbol $y_{n,l}$ as shown in Equation (6), and then adds each of the error signals as shown in Equation (7) to find the final error signal $\Lambda$.

$$\begin{bmatrix} y_{0,0} \\ \vdots \\ y_{0,L-1} \\ y_{1,0} \\ \vdots \\ y_{N-1,L-1} \end{bmatrix} \Leftrightarrow \begin{bmatrix} \tilde{r}_{0,0} \\ \vdots \\ \tilde{r}_{0,L-1} \\ \tilde{r}_{1,0} \\ \vdots \\ \tilde{r}_{N-1,L-1} \end{bmatrix} = H \begin{bmatrix} s_0 \\ s_1 \\ \vdots \\ s_{M-1} \end{bmatrix} \tag{6}$$

$$\Lambda = \sum_{n=0}^{N-1} \sum_{l=0}^{L-1} |y_{n,l} - \tilde{r}_{n,l}|^2 \tag{7}$$

Bit likelihood calculation unit 944 receives as input error signals $\Lambda$ that correspond to all transmission antenna symbols s and calculates the likelihood for each bit that is transmitted from each transmission antenna. At this time, bit likelihood calculation unit 944 applies the bit likelihood as input to error correction decoder (not shown) (for example, turbo decoder) and restores the information bit sequence. One method for calculating bit likelihood is based on the difference between the minimum error signal of the symbol in which the target bit is +1 and the minimum error signal of the symbol in which the target bit is −1, as described in N. Maeda, K. Higuchi, J. Kawamoto, M. Sawahashi, M. Kimata, and S. Yoshida, "QRM-MLD Combined with MMSE-Based Multipath Interference Canceller for MIMO Multiplexing in Broadband DS-CDMA" (Proc. IEEE PIMRC 2004, pp. 1741-1746, September 2004 (Document 2)).

FIG. 4 is a block diagram showing the configuration of another MIMO receiver of the prior art. The MIMO receiver shown in FIG. 4 has a greatly decreased amount of MLD calculation compared to the device shown in FIG. 2 (see Document 2).

Referring to FIG. 4, the MIMO receiver of the prior art includes: reception antennas $91_1$-$91_N$; despreaders $92_{11}$-$92_{1L}$, ..., $92_{N1}$-$92_{NL}$; transmission channel estimation unit 93; QR decomposition unit 95, $Q^H$ converter 96; and reduced-calculation-load MLD unit 97.

Reception antennas $91_1$-$91_N$, despreaders $92_{11}$-$92_{1L}$, ..., $92_{N1}$-$92_{NL}$, and transmission channel estimation unit 93 each have the same configuration as FIG. 2.

QR decomposition unit 95 decomposes the transmission channel matrix H that is obtained in transmission channel estimation unit 93 into the product of the Q matrix and R matrix as shown in Equation (8), sends Q to $Q^H$ converter 96, and sends R to reduced-calculation-load MLD unit 97.

$$H = QR \tag{8}$$

$$= \begin{bmatrix} q_{0,0,0} & q_{1,0,0} & \cdots & q_{M-1,0,0} \\ \vdots & \vdots & \ddots & \vdots \\ q_{0,0,L-1} & q_{1,0,L-1} & \cdots & q_{M-1,0,L-1} \\ q_{0,1,0} & q_{1,1,0} & \cdots & q_{M-1,1,0} \\ \vdots & \vdots & \ddots & \vdots \\ q_{0,N-1,L-1} & q_{1,N-1,L-1} & \cdots & q_{M-1,N-1,L-1} \end{bmatrix}$$

$$\begin{bmatrix} r_{0,0} & r_{0,1} & \cdots & r_{0,M-1} \\ 0 & r_{1,1} & \cdots & r_{1,M-1} \\ \vdots & 0 & \ddots & \vdots \\ 0 & \cdots & 0 & r_{M-1,M-1} \end{bmatrix}$$

In this case, Q is a unitary matrix of (N×L) rows and M column, each column vector being orthogonal ($Q^H Q = 1$), and the norm is 1. R is an upper triangular matrix of M rows and M columns.

$Q^H$ converter 96 multiplies despread symbol vector y with $Q^H$ to convert y to an orthogonal coordinate system represented by Q. $Q^H$ converter 96 is of a configuration for realizing computation for multiplying $Q^H$ by multipliers and adders. Signal vector z after coordinate conversion is represented by Equation (9).

$$z = Q^H y \tag{9}$$

$$= \begin{bmatrix} z_0 \\ z_1 \\ \vdots \\ z_{M-1} \end{bmatrix}$$

$$= \begin{bmatrix} q^*_{0,0,0} & \cdots & q^*_{0,0,L-1} & q^*_{0,1,0} & \cdots & q^*_{0,N-1,L-1} \\ q^*_{1,0,0} & \cdots & q^*_{1,0,L-1} & q^*_{1,1,0} & \cdots & q^*_{1,N-1,L-1} \\ \vdots & \ddots & \vdots & \vdots & \ddots & \vdots \\ q^*_{M-1,0,0} & \cdots & q^*_{M-1,0,L-1} & q^*_{M-1,1,0} & \cdots & q^*_{M-1,N-1,L-1} \end{bmatrix}$$

$$\begin{bmatrix} y_{0,0} \\ \vdots \\ y_{0,L-1} \\ y_{1,0} \\ \vdots \\ y_{N-1,L-1} \end{bmatrix}$$

$$= Q^H(Hs + n)$$
$$= Q^H(QRs + n)$$
$$= Q^H QRs + Q^H n$$
$$= Rs + Q^H n$$
$$= Rs + n'$$

In this case, noise n' is noise n projected onto an orthogonal coordinate system represented by Q, and therefore uncorrelated with n at the same power.

Reduced-calculation-load MLD unit 97 uses the R matrix from QR decomposition unit 95 to generate reception replicas for the signals of all transmission antennas, calculates the error signals between the reception replicas and the signal vector z following coordinate conversion, and after cutting back symbol candidates, selects the most likely transmission antenna signal.

FIG. 5 is a block diagram showing the configuration of reduced-calculation-load MLD unit 97. Referring to FIG. 5, reduced-calculation-load MLD unit 97 includes: transmission symbol candidate generation unit 971, reception replica generation unit 972, error signal calculation/symbol candidate reduction unit 973, and bit likelihood calculation unit 974.

As with transmission symbol candidate generation unit 941 of FIG. 3, transmission symbol candidate generation unit 971 generates transmission symbol vector s, which is the combination of all transmission antenna symbols, and sends transmission symbol vector s to reception replica generation unit 972.

Reception replica generation unit 972 generates all reception replicas $\tilde{r}=Rs$ from transmission symbol vector s from transmission symbol candidate generation unit 971 and matrix R from QR decomposition unit 95 and sends the reception replicas to error signal calculation/symbol candidate reduction unit 973.

Error signal calculation/symbol candidate reduction unit 973 reduces symbol candidates while finding error signal $\Lambda_m$ from reception replicas $\tilde{r}_m$ and signal vector $z_m$ following coordinate conversion by $Q^H$ converter 96 over a plurality of stages for the plurality of transmission antennas.

As an example, the reduction of symbol candidates is carried out successively starting from the largest transmission antenna number.

In each stage of the reduction of symbol candidates, error signal calculation/symbol candidate reduction unit 973 compares reception replicas $\tilde{r}_m$ and signal vectors $z_m$ as shown in Equation (10), and finds error signal $\Lambda_m$ as shown in Equation (11). Error signal calculation/symbol candidate reduction unit 973 further reduces symbol candidates by selecting only a prescribed number from the symbol candidates having low error signals $\Lambda_m$.

$$\begin{bmatrix} z_0 \\ z_1 \\ \vdots \\ z_{M-1} \end{bmatrix} \Leftrightarrow \begin{bmatrix} \tilde{r}_0 \\ \tilde{r}_1 \\ \vdots \\ \tilde{r}_{M-1} \end{bmatrix} = R \begin{bmatrix} s_0 \\ s_1 \\ \vdots \\ s_{M-1} \end{bmatrix} \quad (10)$$

$$\Lambda_m = \sum_{i=m}^{M-1} |z_i - \tilde{r}_i|^2 \quad (11)$$

Bit likelihood calculation unit 974 calculates the likelihood for each bit that is transmitted from each transmission antenna based on the error signals $\Lambda$ that correspond to all transmission antenna symbols s that have been finally eliminated.

Nevertheless, the above-described prior art has the following drawbacks.

The MIMO receiver of the prior art shown in FIG. 2 compares the reception replicas that are generated using the transmission channel estimation values of each path with the multipath signals that are separated in despreading to perform a signal separation process by MLD. At this time, the differences in levels of the multipath signals is not taken into consideration, and as a result, when there are differences in the levels of each multipath signal, the multipath interference sustained by each path differs, multipaths having a low level receiving the greatest multipath interference. In a MIMO receiver of the prior art, the influence of multipath interference is not taken into consideration in the calculation of error signals, and as a result, there is a disproportionately large addition of the error signal of multipaths having a low level and a consequent degradation of the signal separation characteristic.

On the other hand, the other MIMO receiver of the prior art shown in FIG. 4, performs the MLD process using signals in which despread signals undergo $Q^H$ conversion, but because the transmission channel matrix is subjected to direct QR decomposition, the operation is principally equivalent to that of the MIMO receiver of FIG. 2, and is therefore subject to the same problem.

SUMMARY OF THE INVENTION

It is an object of the present invention to provide a MIMO receiver, reception method, and radio communication system that can obtain a superior signal separation characteristic regardless of differences between the levels of multipath signals.

To attain the above-described object, the MIMO receiver of the present invention is a MIMO receiver for receiving signals that have been transmitted from a plurality of transmission antennas by means of a plurality of reception antennas and includes a multipath linear combining unit and a maximum likelihood detector. The multipath linear combining unit performs linear combining of multipaths in the received signals of the reception antennas by means of a transmission channel matrix between the plurality of transmission antennas and the plurality of reception antennas. The maximum likelihood detector compares the signals in which the multipaths have been combined by the multipath linear combining unit with reception replicas that have been found using the transmission channel matrix to estimate the transmission signals of each of the transmission antennas.

The present invention enables optimum combining of the multipath signals for the signal of each transmission antenna by means of a combining method that takes into consideration differences in the levels of multipath signals, and further allows a superior signal separation characteristic to be obtained regardless of the differences in level of multipath signals.

In addition, the MIMO receiver of the present invention may further include a whitening filter for whitening the noise in the signals in which multipaths have been combined by the multipath linear combining unit and for providing this whitened signal to the maximum likelihood detector.

The maximum likelihood detection process is therefore carried out after whitening noise after combining of the multipath signals, with the result that a superior signal separation characteristic can be realized in which the effect of noise is mitigated.

The above and other objects, features, and advantages of the present invention will become apparent from the following description with references to the accompanying drawings which illustrate examples of the present invention.

DETAILED DESCRIPTION OF THE PREFERRED EMBODIMENTS

Figure 1:
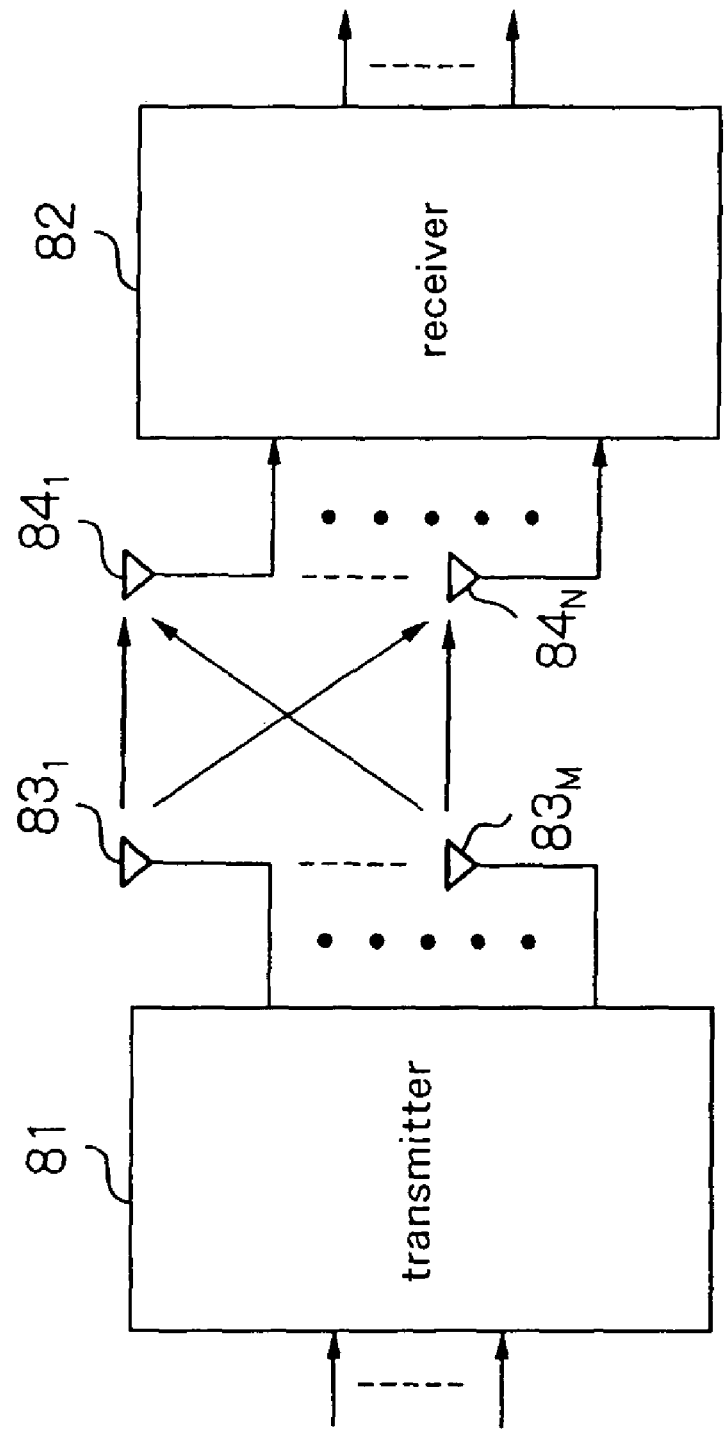
FIG. 1 is a block diagram showing the configuration of a typical radio communication system that Uses MIMO.
Figure 2:
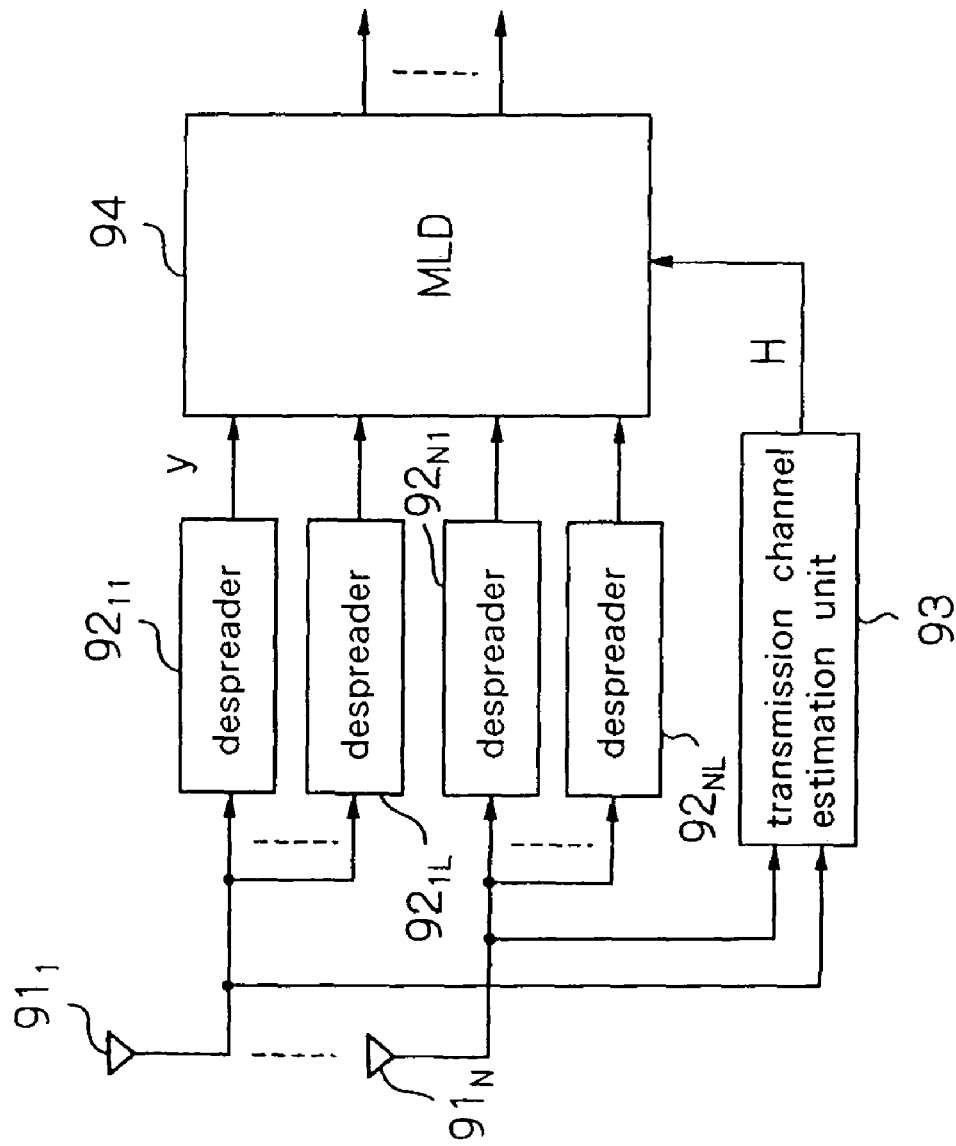
FIG. 2 is a block diagram showing the configuration of a MIMO receiver of the prior art.
Figure 3:
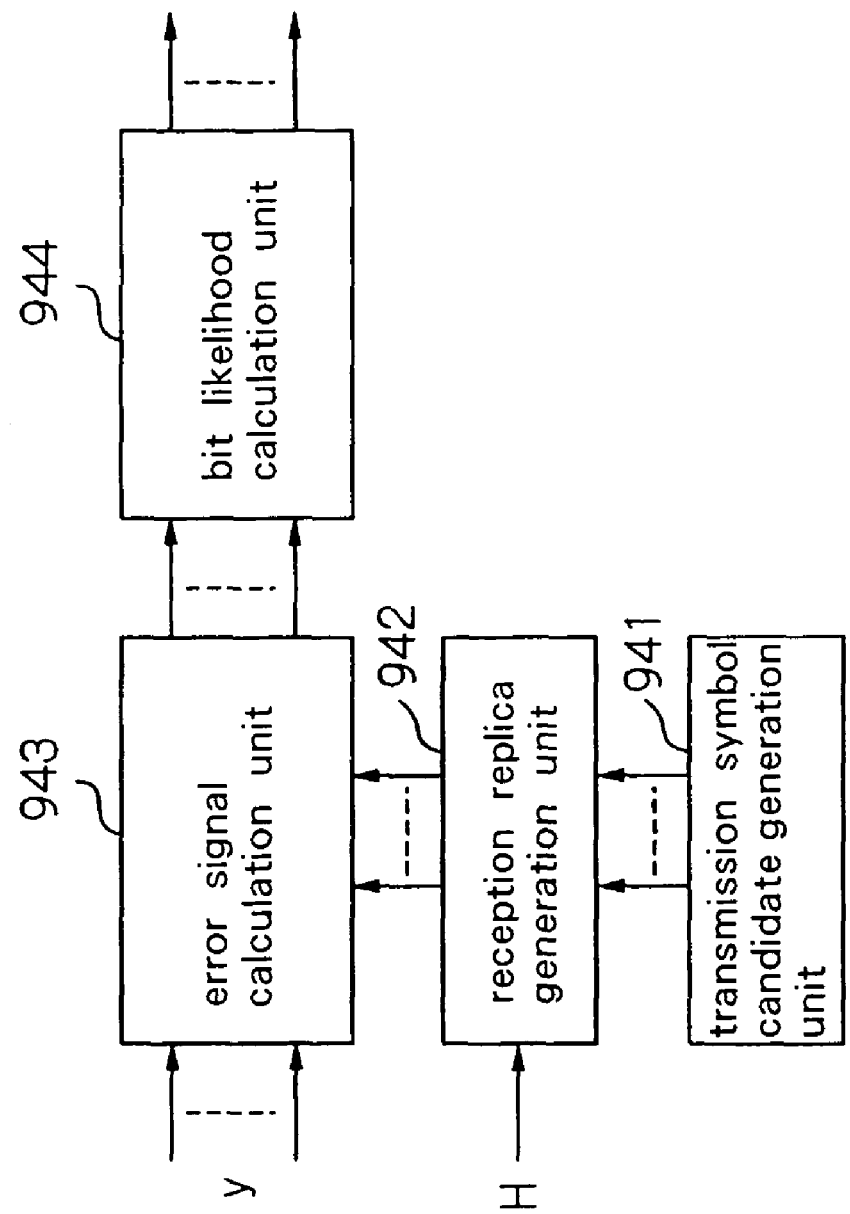
FIG. 3 is a block diagram showing the configuration of the MLD unit shown in FIG. 2.
Figure 4:
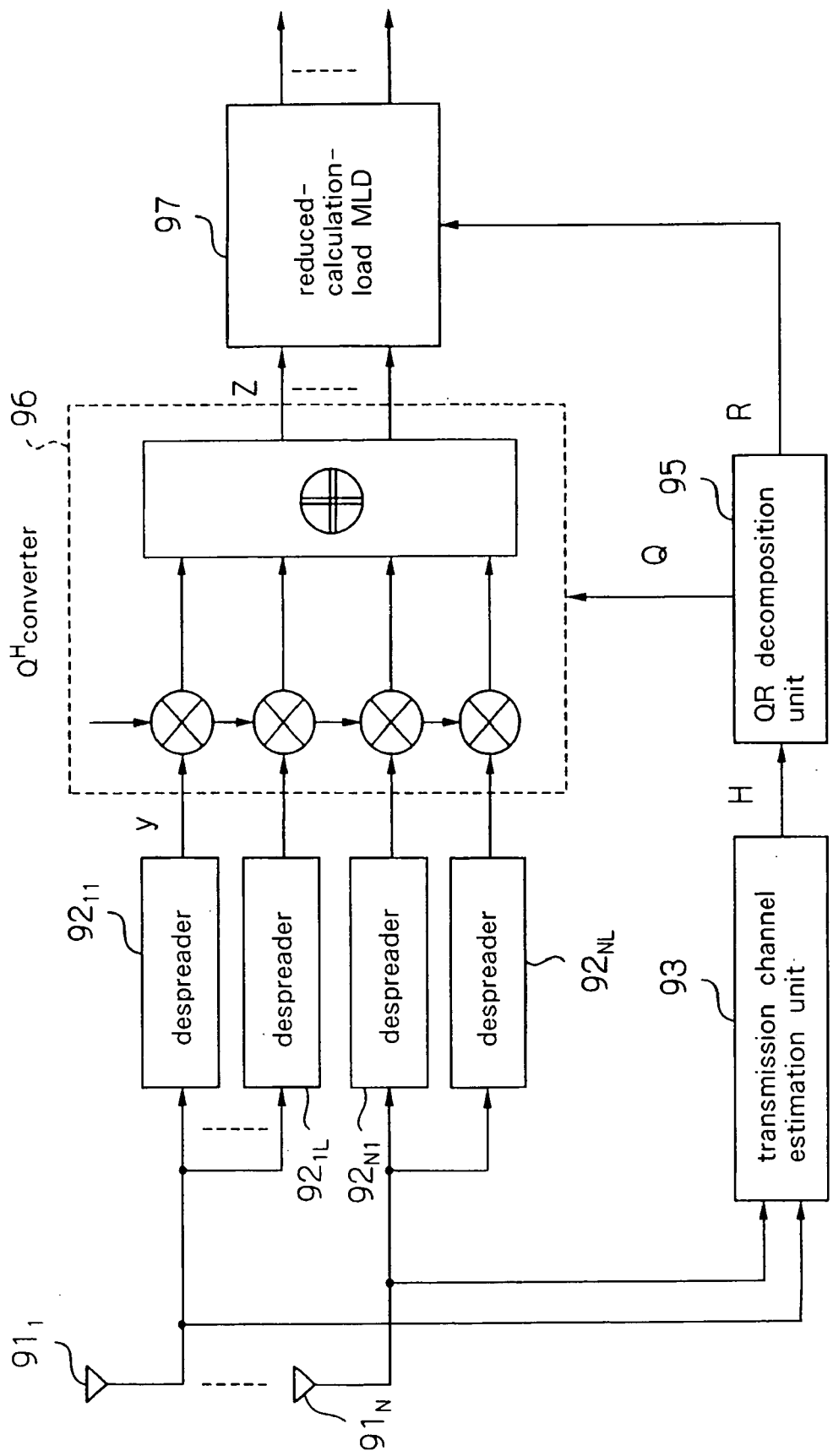
FIG. 4 is a block diagram showing the configuration of another MIMO receiver of the prior art.
Figure 5:
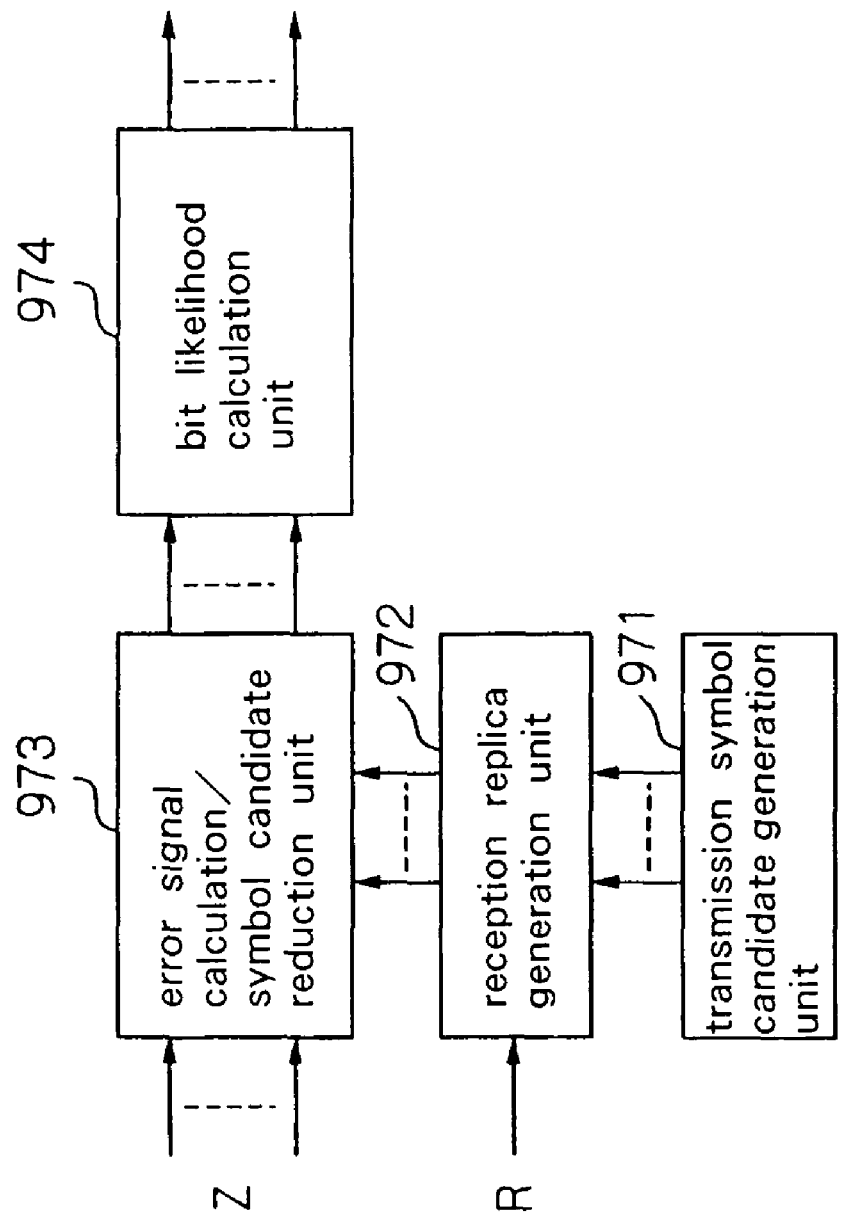
FIG. 5 is a block diagram showing the configuration of the reduced-calculation-load MLD unit shown in FIG. 4.
Figure 6:
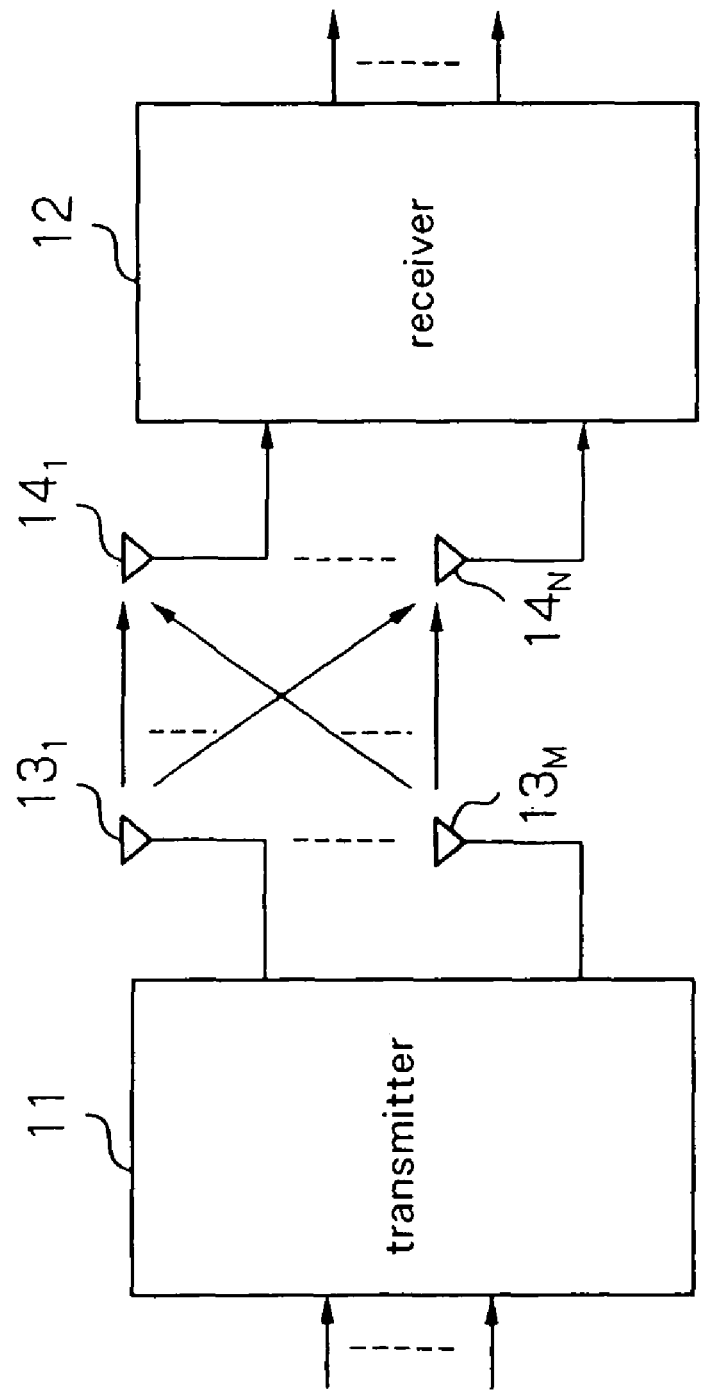
FIG. 6 is a block diagram showing the configuration of a radio communication system realized according to the first embodiment.

FIG. 6 is a block diagram showing the configuration of the radio communication system according to the first embodiment. This system uses MIMO (Multiple Input Multiple Output) multiplexing, and in this case, the number of transmission antennas is M (where M is an integer equal to or greater than 1) and the number of reception antennas is N (where N is an integer equal to or greater than 1).

Referring to FIG. 6, the radio communication system includes transmitter 11 and receiver 12. Transmitter 11 includes transmission antennas $13_1$-$13_M$, and receiver 12 includes reception antennas $14_1$-$14_N$.

Transmitter 11 transmits a different signal from each of the plurality of transmission antennas $13_1$-$13_M$ at the same frequency and at the same time. Receiver 12 uses the plurality of reception antennas $14_1$-$14_N$ to receive the signals that are transmitted from transmitter 11, and demodulates M signals from the received signals by means of a signal separation process.

Figure 7:
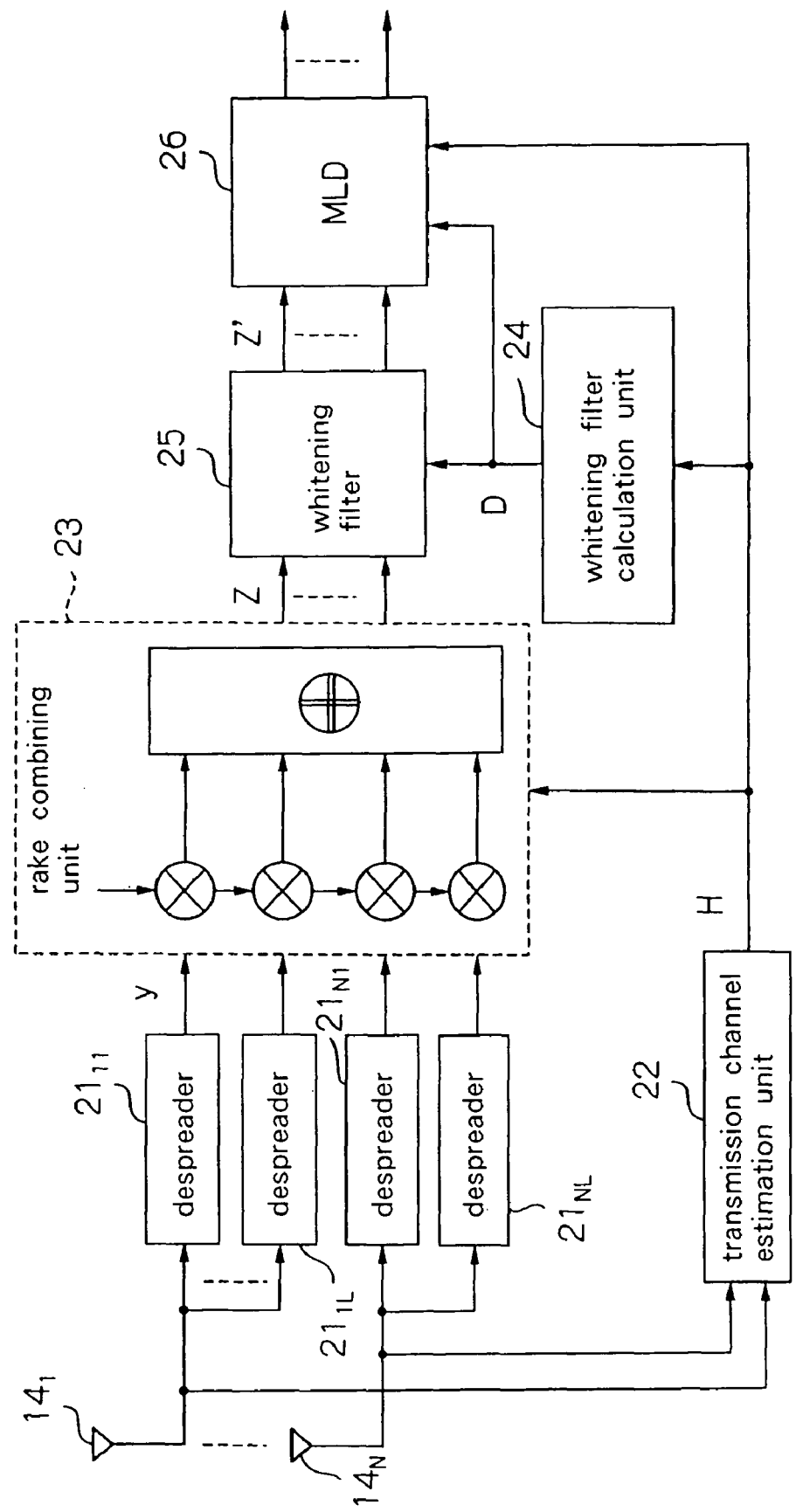
FIG. 7 is a block diagram showing the configuration of the receiver according to the first embodiment.

FIG. 7 is a block diagram showing the configuration of the receiver according to the first embodiment. This receiver may be, for example, either a base station radio device or a mobile station radio device of a mobile communication system. Referring to FIG. 7, receiver 12 includes: reception antennas $14_1$-$14_N$; despreaders $21_{11}$-$21_{1L}$, ..., $21_{N1}$-$21_{NL}$; transmission channel estimation unit 22; rake combining unit 23; whitening filter calculation unit 24; whitening filter 25; and MLD unit 26.

Each of despreaders $21_{11}$-$21_{1L}$ despreads each of the paths of respective signals received at reception antenna $14_1$. Similarly, the received signals of each of the reception antennas are despread by the L despreaders for each path, and the signals received at reception antenna $14_N$ are despread for each path by despreaders $21_{N1}$-$21_{NL}$. The thus-obtained despread signals are provided to rake combining unit 23.

Transmission channel estimation unit 22 takes as input the signals that have been received at reception antennas $14_1$-$14_N$, and uses a known pilot signal that is contained in these received signals to estimate for each path the transmission channel estimation value between the transmission and reception antennas.

Rake combining unit 23 uses the transmission channel estimation values that are obtained at transmission channel estimation unit 22 to carry out optimum rake combining for each transmission antenna. In rake combining, maximum ratio combining (MRC) is typically carried out to maximize the signal-to-noise ratio (S/N) after combining, and the use of this maximum ratio combining is assumed in this case. Rake combining unit 23 is of a configuration for realizing the calculations for combining multipaths by means of multipliers and adders. The signal vector z following rake combining is represented by Equation (12).

$$z = H'^H y \qquad (12)$$

$$= \begin{bmatrix} z_0 \\ z_1 \\ \vdots \\ z_{M-1} \end{bmatrix}$$

$$= \begin{bmatrix} h'^*_{0,0,0} & \cdots & h'^*_{0,0,L-1} & h'^*_{0,1,0} & \cdots & h'^*_{0,N-1,L-1} \\ h'^*_{1,0,0} & \cdots & h'^*_{1,0,L-1} & h'^*_{1,1,0} & \cdots & h'^*_{1,N-1,L-1} \\ \vdots & \ddots & \vdots & \vdots & \ddots & \vdots \\ h'^*_{M-1,0,0} & \cdots & h'^*_{M-1,0,L-1} & h'^*_{M-1,1,0} & \cdots & h'^*_{M-1,N-1,L-1} \end{bmatrix}$$

$$\begin{bmatrix} y_{0,0} \\ \vdots \\ y_{0,L-1} \\ y_{1,0} \\ \vdots \\ y_{N-1,L-1} \end{bmatrix}$$

$$= H'^H(Hs + n)$$

$$= = H'^H Hs + H'^H n$$

$$= H'^H Hs + n'$$

Here, $h'_{m,n,l}$ is equal to $h_{m,n,l}/\sigma^2_{m,n,l}$, and $\sigma^2_{m,n,l}$ is the noise interference power. A correlation of noise n' is generated by means of $H^H$ conversion, and direct use without alteration of the signal vector z following rake combining to perform the MLD process results in degradation of the signal separation characteristic. In the present embodiment, however, the noise of the signal vector z following rake combining is whitened.

Whitening filter calculation unit 24 calculates the coefficient of the whitening filter (linear filter) for whitening the noise of the signal vector z that follows rake combining, and provides this coefficient to whitening filter 25. In this case, D is the whitening filter matrix. Whitening filter matrix D should satisfy Equation (14).

$$D^H R_{in} D = I (R_{in} = H'^H H') \qquad (14)$$

If the characteristic value matrix of correlation matrix $R_{in}$ is $\Lambda$ and the characteristic vector matrix is U, correlation matrix $R_{in}$ can be decomposed as $R_{in} = U \Lambda U^H$, and whitening filter matrix D can be found by Equation (15).

$$D = U \Lambda^{-1/2} \qquad (15)$$

Whitening filter 25 uses whitening filter matrix D that has been obtained by whitening filter calculation unit 24 to filter signal vector z that follows rake combining, finds signal vector z' in which noise has been whitened as shown in Equation (16), and sends this result to MLD unit 26.

$$z' = D^H z \qquad (16)$$

MLD unit 26 uses transmission channel matrix H that is obtained by transmission channel estimation unit 22 and whitening filter matrix D that is obtained by whitening filter calculation unit 24 to generate reception replicas for the signals from all transmission antennas, calculates the error signal between signal vector z' from whitening filter 25 and the reception replicas, and selects the most likely transmission antenna signal.

Figure 8:
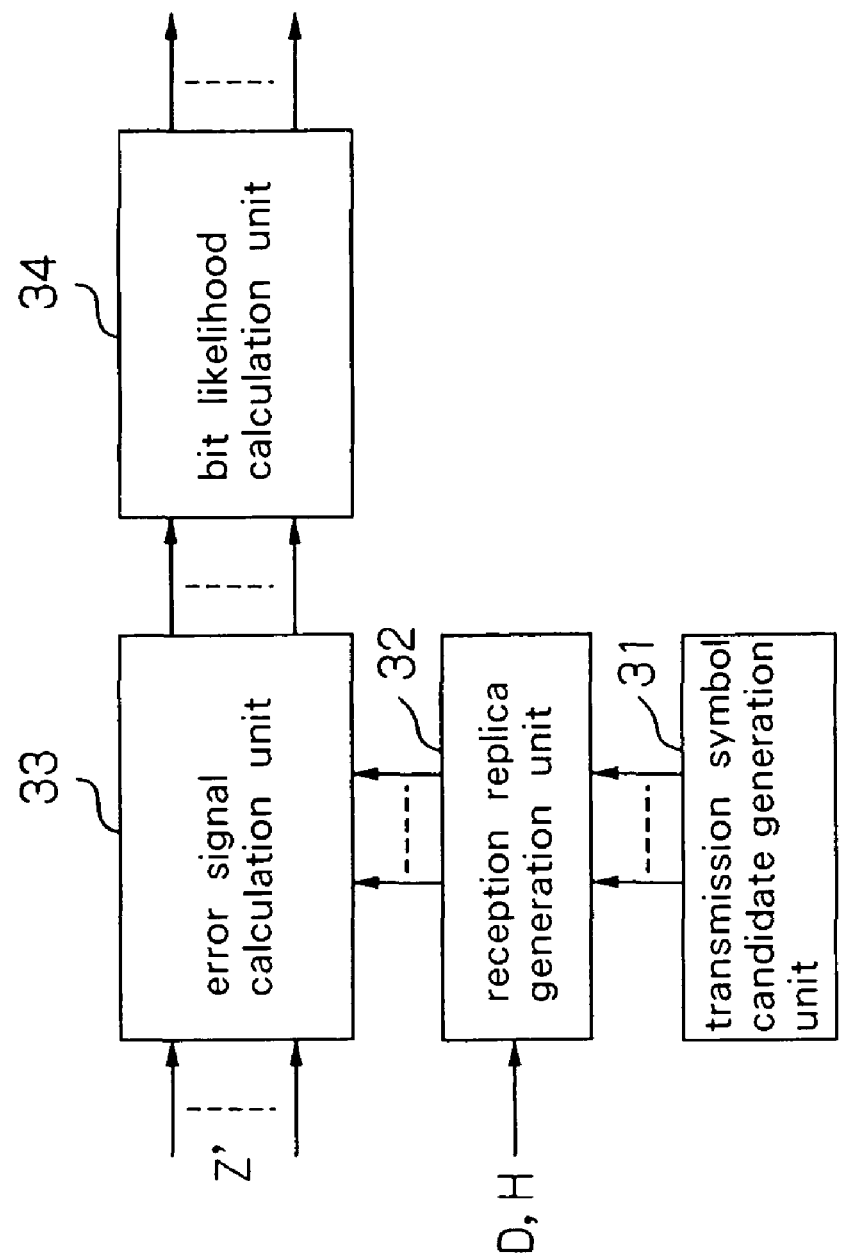
FIG. 8 is a block diagram showing the configuration of the MLD unit.

FIG. 8 is a block diagram showing the configuration of MLD unit 26. Referring to FIG. 8, MLD unit 26 includes: transmission symbol candidate generation unit 31, reception replica generation unit 32, error signal calculation unit 33, and bit likelihood calculation unit 34.

Transmission symbol candidate generation unit 31 generates transmission symbol vector s, which is the combination of all transmission antenna symbols, and sends this result to reception replica generation unit 32.

Based on Equation (12) and Equation (16), signal vector z' in which noise has been whitened can be represented as shown in Equation (17).

$$z' = D^H H'^H (Hs + n) = D^H H'^H Hs + D^H H'^H n = D^{H'H} Hs + n' \qquad (17)$$

Noise n' is whitened and therefore uncorrelated.

Reception replica generation unit 32 generates all reception replicas $\tilde{r} = D^H H'^H Hs$ based on transmission symbol vector s from transmission symbol candidate generation unit 31 and transmission channel matrix H and whitening filter matrix D.

As shown in Equation (18), error signal calculation unit 33 compares signal $z_m'$ in which noise has been whitened with reception replicas $\tilde{r}_m$ from reception replica generation unit 32 over the plurality of transmission antennas to find the error signals, and adds each of the error signals as shown in Equation (19) to calculate the final error signal $\Lambda$ $$\begin{bmatrix} z_0' \\ z_1' \\ \vdots \\ z_{M-1}' \end{bmatrix} \Leftrightarrow \begin{bmatrix} \tilde{r}_0 \\ \tilde{r}_1 \\ \vdots \\ \tilde{r}_{M-1} \end{bmatrix} = D^H H'^H H \begin{bmatrix} s_0 \\ s_1 \\ \vdots \\ s_{M-1} \end{bmatrix} \qquad (18)$$

$$\Lambda = \sum_{m=0}^{M-1} |z_m' - \tilde{r}_m|^2 \qquad (19)$$

Bit likelihood calculation unit 34 receives the error signals $\Lambda$ corresponding to all transmission antenna symbols s and calculates the likelihood for each bit that is transmitted from each transmission antenna. At this time, bit likelihood calculation unit 34 applies bit likelihood to an error correction decoder (for example, a turbo decoder) (not shown in the figures) and restores the information bit sequence. Methods for calculating the bit likelihood include, for example, a method of calculation based on the difference between the minimum error signal of the symbol in which the target bit is +1 and the minimum error signal of the symbol in which the target bit is −1 as described in Document 2. Bit likelihood calculation unit 34 of the present embodiment can also apply any other known calculation method.

As described in the foregoing explanation, according to the present embodiment: rake combining unit 23 uses transmission channel matrix H to perform rake combining of the received signals of the plurality of reception antennas $14_1$-$14_N$ for each of transmission antennas $13_1$-$13_M$ and thus performs combining that takes into consideration the influence of the differences in levels between multipaths; whitening filter 25 uses whitening filter matrix D to filter the signals following rake combining by rake combining unit 23 and thus whitens the noise; and MLD unit 26 uses transmission channel matrix H and whitening filter matrix D to determine the most likely transmission antenna signal for each transmission antenna from signals in which noise has been whitened by whitening filter 25.

As a result, carrying out optimum combining of multipath signals for each transmission antenna signal to confer small weights to multipath signals having low levels allows a superior signal separation characteristic to be obtained regardless of differences in levels between multipath signals. In addition, whitening noise after combining of multipath signals to perform the MLD process reduces the influence of noise and enables the realization of a superior signal separation characteristic.

Although a case has been described as a preferable example in which the noise of signal vector z was whitened by whitening filter 25 and the MLD process then carried out, the present invention is not limited to this form. The receiver can also operate by carrying out the MLD process without whitening noise by means of whitening filter 25. In such a case, whitening filter calculation unit 24 and whitening filter 25 in FIG. 7 are unnecessary, and whitening filter matrix D need not be applied as input to MLD unit 26.

Explanation next regards the second embodiment of the present invention with reference to the accompanying figures. The radio communication system according to the second embodiment is of the same configuration as in the first embodiment shown in FIG. 6.

Figure 9:
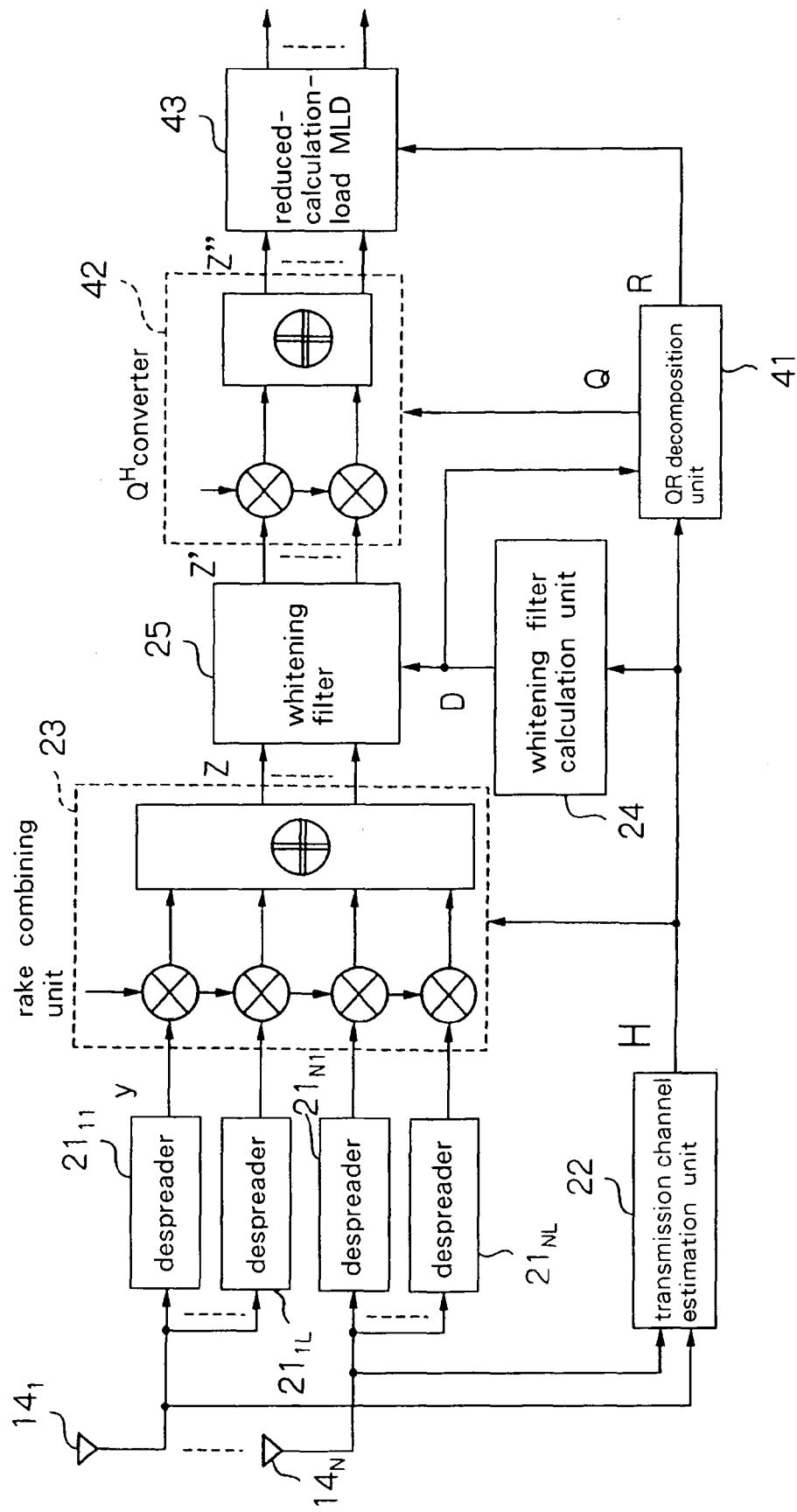
FIG. 9 is a block diagram showing the configuration of the receiver according to the second embodiment.

FIG. 9 is a block diagram showing the configuration of the receiver according to the second embodiment. Referring to FIG. 9, receiver 12 includes: reception antennas $14_1$-$14_N$; despreaders $21_{11}$-$21_{1L}$, ..., $21_{N1}$-$21_{NL}$; transmission channel estimation unit 22; rake combining unit 23; whitening filter calculation unit 24; whitening filter 25; QR decomposition unit 41; $Q^H$ conversion unit 42; and reduced-calculation-load MLD unit 43.

Reception antennas $14_1$-$14_N$; despreaders $21_{11}$-$21_{1L}$, ..., $21_{N1}$-$21_{NL}$; transmission channel estimation unit 22; rake combining unit 23; whitening filter calculation unit 24; and whitening filter 25 are all the same, as in the first embodiment shown in FIG. 7.

Whitening filter calculation unit 24 finds whitening filter matrix D shown in the above-described Equation (15). Whitening filter matrix D is provided to whitening filter 25 and to QR decomposition unit 41.

In addition, whitening filter 25 uses whitening filter matrix D to filter signal vector z that follows rake combining by rake combining unit 23, finds signal vector z' in which noise is whitened as shown in Equation (16), and sends the result to $Q^H$ conversion unit 42.

QR decomposition unit 41 uses transmission channel matrix H from transmission channel estimation unit 22 and whitening filter matrix D from whitening filter calculation unit 24 to decompose matrix $D^H H^H H$ into the product of the Q matrix and R matrix as shown in Equation (20); and sends the Q matrix to $Q^H$ conversion unit 42 and the R matrix to reduced-calculation-load MLD unit 43.

$$D^H H'^H H = QR \quad (20)$$

$$= \begin{bmatrix} q_{0,0} & q_{0,1} & \cdots & q_{0,M-1} \\ q_{1,0} & q_{1,1} & \cdots & q_{1,M-1} \\ \vdots & \vdots & \ddots & \vdots \\ q_{M-1,0} & q_{M-1,1} & \cdots & q_{M-1,M-1} \end{bmatrix}$$

$$\begin{bmatrix} r_{0,0} & r_{0,1} & \cdots & r_{0,M-1} \\ 0 & r_{1,1} & \cdots & r_{1,M-1} \\ \vdots & 0 & \ddots & \vdots \\ 0 & \cdots & 0 & r_{M-1,M-1} \end{bmatrix}$$

Here, the Q matrix is a unitary matrix of M rows and M columns. In addition, each column vector of the Q matrix is orthogonal ($Q^H Q = I$), and the norm is 1. The R matrix is an upper triangular matrix of M rows and M columns.

$Q^H$ conversion unit 42 multiplies $Q^H$ by signal z' in which noise has been whitened and thus converts z' to an orthogonal coordinate system represented by Q. $Q^H$ conversion unit 42 is of a configuration for realizing calculation by multiplying $Q^H$ by multipliers and adders. Signal vector z" that follows conversion of coordinates is represented by Equation (21).

$$z'' = Q^H z' \quad (21)$$

$$= \begin{bmatrix} z_0'' \\ z_1'' \\ \vdots \\ z_{M-1}'' \end{bmatrix}$$

$$= \begin{bmatrix} q_{0,0}^* & q_{1,0}^* & \cdots & q_{M-1,0}^* \\ q_{0,1}^* & q_{1,1}^* & \cdots & q_{M-1,1}^* \\ \vdots & \vdots & \ddots & \vdots \\ q_{0,M-1}^* & q_{1,M-1}^* & \cdots & q_{M-1,M-1}^* \end{bmatrix} \begin{bmatrix} z_0' \\ z_1' \\ \vdots \\ z_{M-1}' \end{bmatrix}$$

$$= Q^H (D^H H'^H H s + n')$$
$$= Q^H (QRs + n')$$
$$= Q^H QRs + Q^H n'$$
$$= Rs + Q^H n'$$
$$= Rs + n''$$

Here, noise n" is noise n' projected onto an orthogonal coordinate system represented by Q, and is therefore uncorrelated with the same power as n'.

Reduced-calculation-load MLD unit 43 uses the R matrix from QR decomposition unit 41 to generate reception replicas that correspond to all transmission antenna signals, calculates the error signals between the reception replicas and the signal vector z" that follows coordinate conversion; and after reducing symbol candidates, selects the most likely transmission antenna signal.

Figure 10:
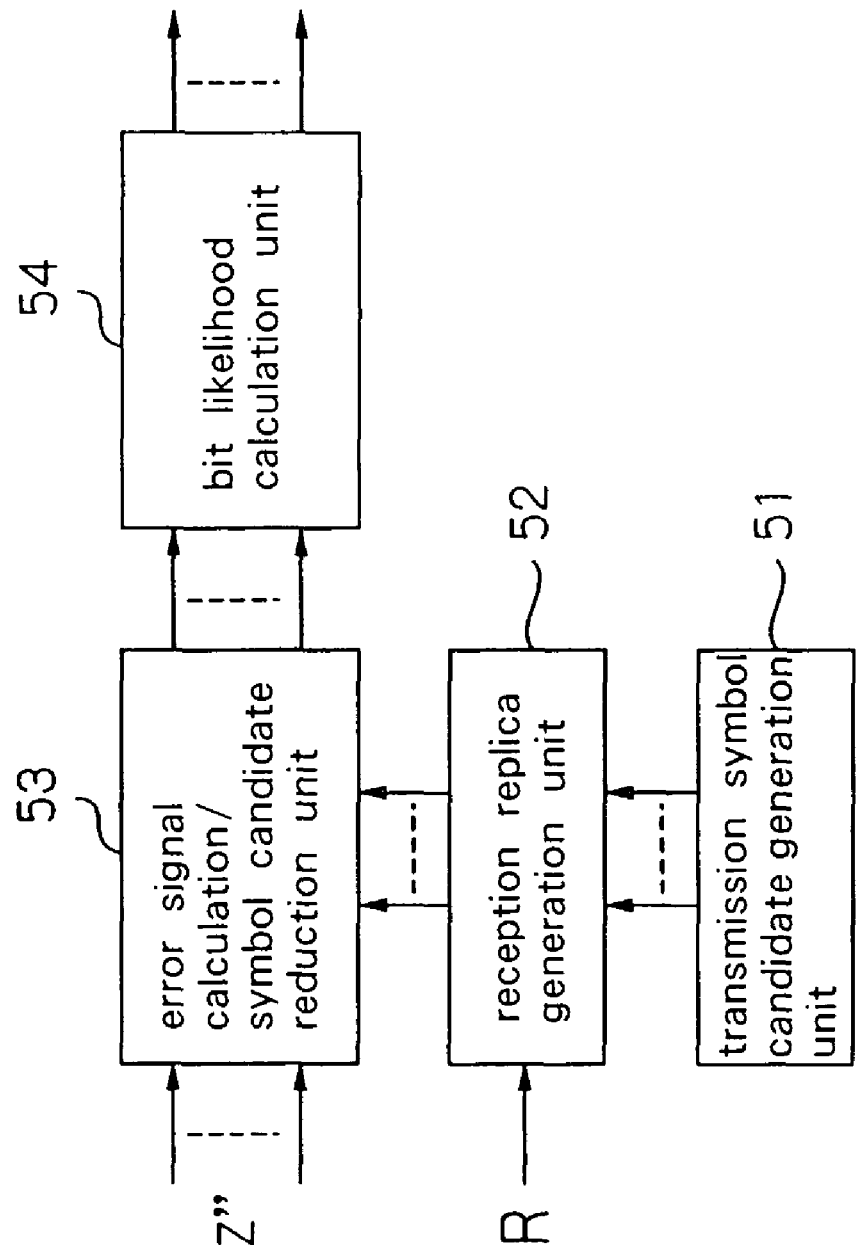
FIG. 10 is a block diagram showing the configuration of a reduced-calculation-load MLD unit.

FIG. 10 is a block diagram showing the configuration of reduced-calculation-load MLD unit 43. Referring to FIG. 10, reduced-calculation-load MLD unit 43 includes: transmission symbol candidate generation unit 51, reception replica generation unit 52, error signal calculation/symbol candidate reduction unit 53, and bit likelihood calculation unit 54.

As with transmission symbol candidate generation unit 31 shown in FIG. 8, transmission symbol candidate generation unit 51 generates transmission symbol vector s, which is the combination of all transmission antenna symbols and sends transmission signal vector s to reception replica generation unit 52.

Reception replica generation unit 52 generates all reception replicas $\tilde{r} = Rs$ based on transmission signal vector s from transmission symbol candidate generation unit 51 and matrix R from QR decomposition unit 41, and sends the result to error signal calculation/symbol candidate reduction unit 53.

Error signal calculation/symbol candidate reduction unit 53 reduces symbol candidates while finding error signals $\Lambda_m$ based on reception replicas $\tilde{r}_m$ and signal vector $z_m''$ that follows coordinate conversion by $Q^H$ conversion unit 96 over a plurality of stages for the plurality of transmission antennas.

As one example, reduction of symbol candidates is carried out successively starting from the largest transmission antenna number.

In each stage of cutting back symbol candidates, error signal calculation/symbol candidate reduction unit 53 compares reception replicas $\tilde{r}_m$ with signal vector $z_m''$ as shown in Equation (22), and finds error signal $\Lambda_m$ as shown in Equation (23). Error signal calculation/symbol candidate reduction unit 53 reduces symbol candidates by selecting only a prescribed number from among symbol candidates for which this value is low.

$$\begin{bmatrix} z_0'' \\ z_1'' \\ \vdots \\ z_{M-1}'' \end{bmatrix} \Leftrightarrow \begin{bmatrix} \tilde{r}_0 \\ \tilde{r}_1 \\ \vdots \\ \tilde{r}_{M-1} \end{bmatrix} = R \begin{bmatrix} s_0 \\ s_1 \\ \vdots \\ s_{M-1} \end{bmatrix} \quad (22)$$

$$\Lambda_m = \sum_{i=m}^{M-1} |z_i'' - \tilde{r}_i|^2 \quad (23)$$

Bit likelihood calculation unit 54 calculates the likelihood for each bit that is transmitted from each transmission antenna based on the error signals $\Lambda$ that correspond to all transmission antenna symbols s that are finally reduced.

As an example, a calculation load reduction algorithm based on QR decomposition is used in reduced-calculation-load MLD unit 43 of the present embodiment, but the present invention is not limited to this form. Any other known calculation load reduction algorithm may be applied in the present invention.

As described hereinabove, as in the first embodiment, the present embodiment allows a superior signal separation characteristic to be obtained despite differences in the level of multipath signals in a receiver that carries out a reduced-calculation-load MLD process.

The present embodiment also allows operation of a receiver in which the whitening of noise is not carried out by a whitening filter.

Explanation next regards the third embodiment of the present invention with reference to the accompanying figures. In the above-described first embodiment, an example was presented in which rake combining (MRC) was used as the method of combining multipath signals, but other methods of combining multipaths exist.

In CDMA, if the spreading rate is sufficiently great and if the code multiplexing number is small for the spreading rate, rake combining can allow multipath signals to be combined while adequately suppressing multipath interference by means of dispreading. However, if the code multiplexing number is large for the spreading rate, rake combining results in a serious degradation of characteristics due to multipath interference.

Minimum Means Square Error (MMSE) and Zero Forcing (ZF) are combining methods (equalizing methods) that take into consideration the suppression of multipath interference. In the third embodiment, an example is shown in which MMSE or ZF is used as the method of combining multipaths.

The radio communication system of the third embodiment is of the same configuration as in the first embodiment shown in FIG. 6.

Figure 11:
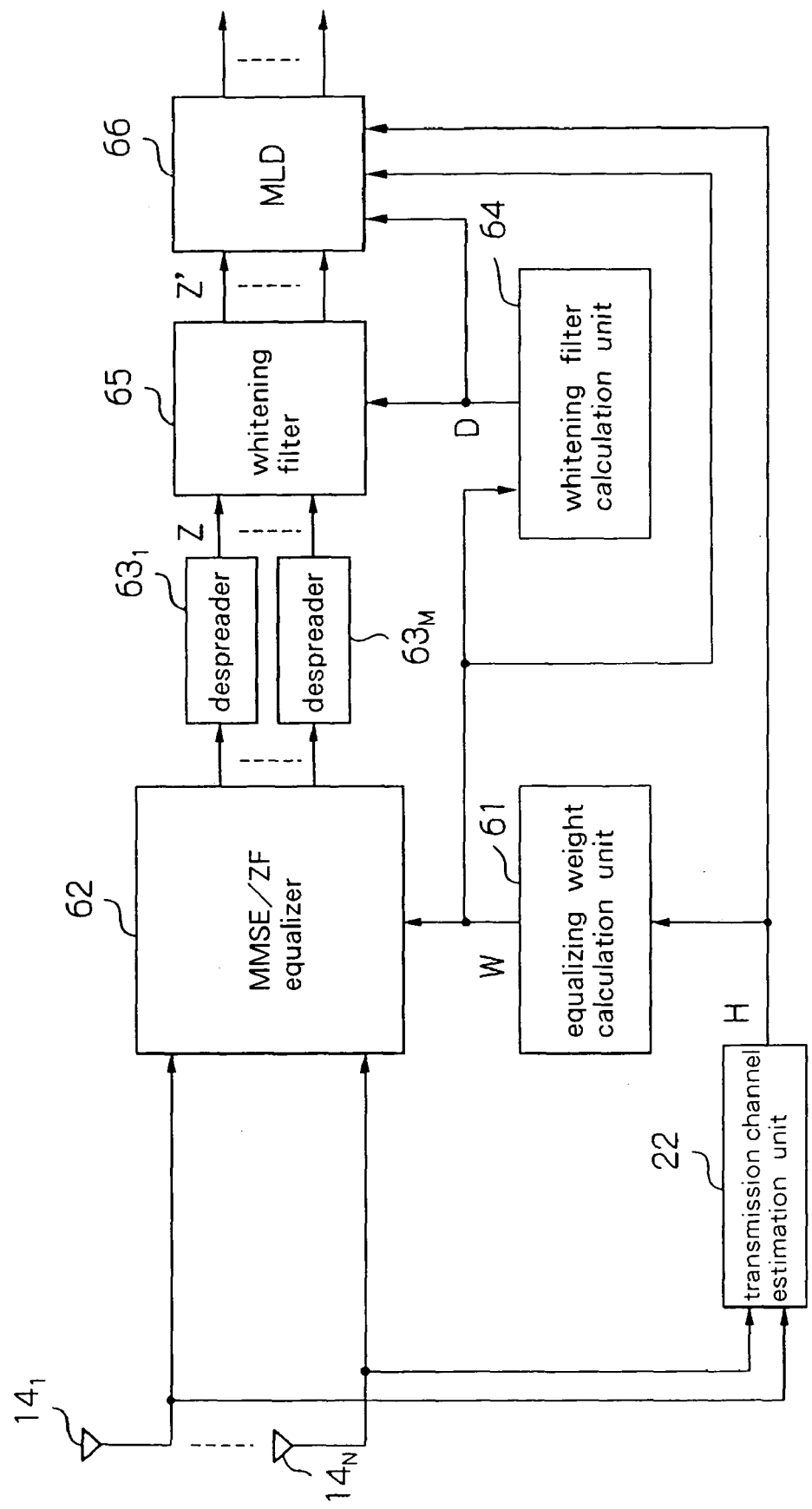
FIG. 11 is a block diagram showing the configuration of the receiver according to the third embodiment.

FIG. 11 is a block diagram showing the configuration of the receiver according to the third embodiment. Referring to FIG. 11, receiver 12 according to the third embodiment includes: reception antennas $14_1$-$14_N$, transmission channel estimation unit 22, equalizing weight calculation unit 61, MMSE/ZF equalizer 62, despreaders $63_1$-$63_M$, whitening filter calculation unit 64, whitening filter 65, and MLD unit 66.

Transmission channel estimation unit 22 takes as input the signals that are received at reception antennas $14_1$-$14_N$ and uses a known pilot signal that is contained in these received signals to estimate the transmission channel estimation values between the transmission and the reception antennas for each path.

Equalizing weight calculation unit 61 uses the transmission channel estimation values that are obtained in transmission channel estimation unit 22 to calculate weights of an equalizing filter (linear filter) by the MMSE or ZF standards and provides these weights to MMSE/ZF equalizer 62. Various algorithms exist for calculating weights, and equalizing weight calculation unit 61 of the present embodiment may use any already existing weight calculation algorithm.

MMSE/ZF equalizer 62 uses the weights provided from equalizing weight calculation unit 61 to perform equalizing filtering of the received signals of reception antennas $14_1$-$14_N$ and thus combine multipath signals while suppressing multipath interference for each transmission antenna. Each of the signals for each transmission antenna that have undergone multipath combining by MMSE/ZF equalizer 62 are provided to respective despreaders $63_1$-$63_M$. When MMSE is used, combining is performed such that the ratio of signal power to noise interference power (S/(N+I)) following combination is maximized. In contrast, when the ZF method is used, combining is carried out such that the ratio of signal power to interference power (S/I) after combining is maximized.

Despreaders $63_1$-$63_M$ despread the signals for each transmission antenna from MMSE/ZF equalizer 62.

If the equalizing filter matrix that is found in equalizing weight calculation unit 61 and used in MMSE/ZF equalizer 62 is W, the signal vector z that is supplied by despreaders $63_1$-$63_M$ can be represented by Equation (24).

$$z = W^H y = W^H(Hs+n) = W^H Hs + W^H n = W^H Hs + n' \quad (24)$$

Here, the size of transmission channel matrix H is matched to equalizing filter matrix W, and transmission channel matrix H is therefore defined by all despreading timing that corresponds to the equalizing window. In this case, "0" is placed in timings in which paths do not exist.

In addition, because correlation for noise n' is generated by $W^H$ conversion, using signal vector z that follows despreading without alteration to carry out the MLD process, results in the degradation of the signal separation characteristic. In response to this problem, the present embodiment implements whitening of the noise of the signal vector z that follows despreading.

Whitening filter calculation unit 64 calculates the coefficient of a whitening filter (linear filter) that whitens the noise of signal vector z that follows despreading, and provides this coefficient to whitening filter 65 and MLD unit 66. The operation of whitening filter calculation unit 64 is the same as that of whitening filter calculation unit 24 of the receiver shown in FIGS. 7 and 9. However, whitening filter calculation unit 66 of the present embodiment differs from whitening filter calculation unit 24 of FIGS. 7 and 9 in that correlation matrix $R_{in}$ is set to $R_{in} = W^H W$.

Whitening filter 65 uses whitening filter matrix D that is obtained in whitening filter calculation unit 24 to filter signal vector z that follows despreading, finds signal vector z' in which noise has been whitened, and sends signal vector z' to MLD unit 66. The operation of whitening filter 65 is the same as that of whitening filter 25 of the receiver shown in FIGS. 7 and 9.

MLD unit 66 uses transmission channel matrix H, equalizing filter matrix W, and whitening filter matrix D to generate reception replicas for the signals from all transmission antennas, calculates the error signals between the reception replicas and signal vector z' from whitening filter 65, and selects the most likely transmission antenna signal.

The operation of MLD unit 66 is similar to that of MLD unit 26 of the receiver shown in FIG. 7. However, the operation differs from that of MLD unit 26 of FIG. 7 in that reception replicas $\tilde{r}$ are found by means of Equation (25).

$$\tilde{r} = D^H W^H H s \quad (25)$$

Although a time domain process was assumed in the preceding description of equalizing weight calculation unit 61 and MMSE/ZF equalizer 62 of the present embodiment, the present invention is not limited to this form, and a frequency domain process may also be applied.

In the present embodiment, moreover, a case was described of carrying out a normal MLD process, but a reduced-calculation-load MLD may also be applied as in the second embodiment.

As described in the foregoing explanation, according to the present embodiment, equalizing weight calculation unit 61 uses transmission channel estimation value H to calculate weights of an MMSE or ZF equalizing filter; MMSE/ZF equalizer 62 uses these weights to implement an equalizing filter process for the received signals of reception antennas $14_1$-$14_N$ and thus carries out combining of multipath signals that takes into consideration the influence of the differences in levels between multipaths while suppressing multipath interference; despreaders $63_1$-$63_M$ despread signals for each transmission antenna; whitening filter 65 whitens the noise of signals after despreading; and MLD unit 66 uses transmission channel matrix H, whitening filter matrix D, and equalizing filter matrix W to determine the most likely transmission antenna signal for each transmission antenna from signals in which noise has been whitened. As a result, in a receiver that uses the combining method of the MMSE or ZF method that takes into consideration the suppression of multipath interference, a superior signal separation characteristic can be obtained regardless of differences in levels of multipath signals.

Further, the receiver in the present embodiment can also operate without carrying out whitening of noise by means of a whitening filter.

Explanation next regards the fourth embodiment with reference to the accompanying figures.

In the above-described third embodiment, as an example in which the suppression of multipath interference is considered, a configuration was shown in which the MLD process was performed after implementing equalizing filtering based on the MMSE or ZF method for multipath interference. However, various other examples can also be considered as configurations that take into consideration the suppression of multipath interference. In the fourth embodiment, an example of a configuration is shown in which the results of first demodulating CDMA received signals (primary demodulation) are used to reproduce multipath signals, and signals obtained by eliminating the multipath interference from these multipath signals are then used to perform rake combining and the MLD process.

The radio communication system of the fourth embodiment is of the same configuration as in the first embodiment shown in FIG. 6.

Figure 12:
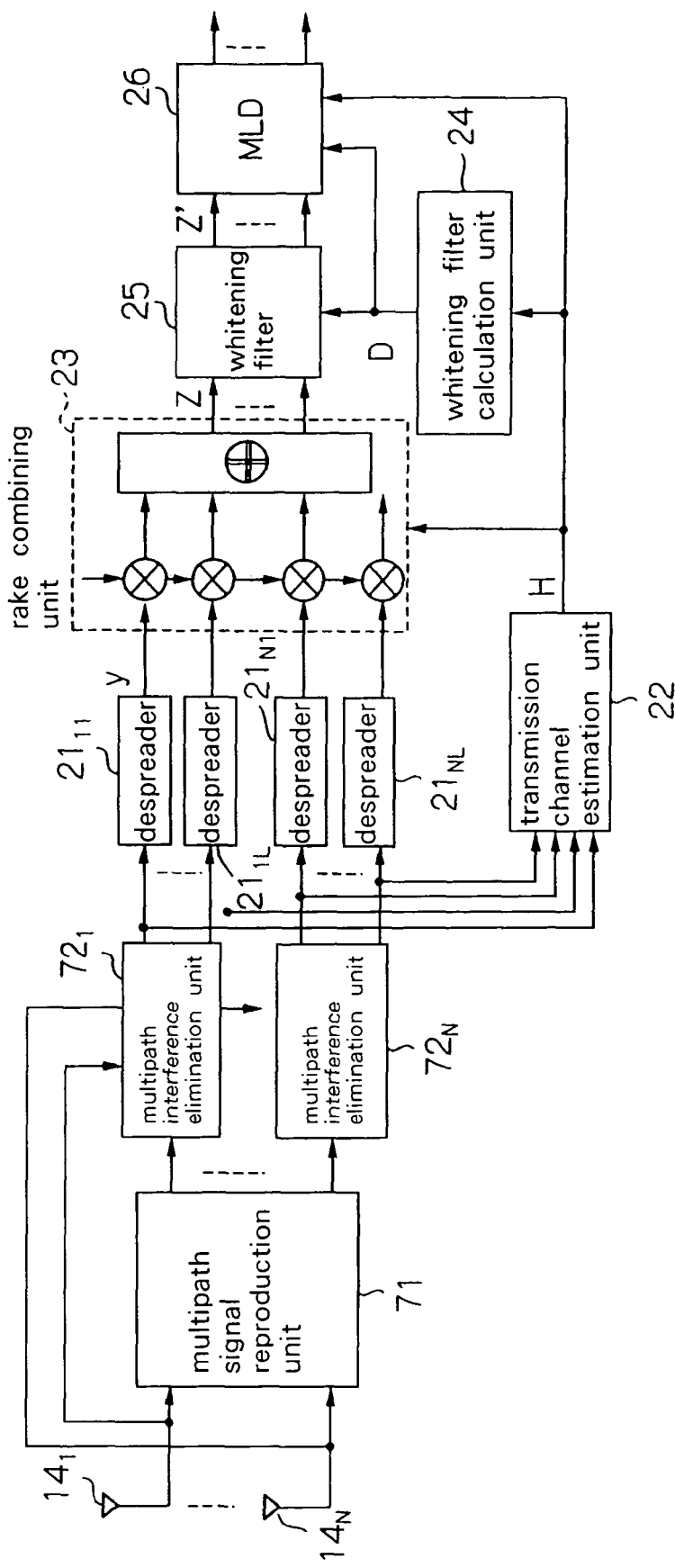
FIG. 12 is a block diagram showing the configuration of the receiver according to the fourth embodiment.

FIG. 12 is a block diagram showing the configuration of the receiver according to the fourth embodiment. Referring to FIG. 12, the receiver of the fourth embodiment includes: reception antennas $14_1$-$14_N$; multipath signal reproduction unit 71, multipath interference elimination units $72_1$-$72_N$, despreaders $21_{11}$-$21_{1L}, \ldots, 21_{N1}$-$21_{NL}$; transmission channel estimation unit 22; rake combining unit 23; whitening filter calculation unit 24; whitening filter 25; and MLD unit 26. Despreaders $21_{11}$-$21_{1L}, \ldots, 21_{N1}$-$21_{NL}$; transmission channel estimation unit 22; rake combining unit 23; whitening filter calculation unit 24; whitening filter 25; and MLD unit 26 are the same as in the first embodiment shown in FIG. 7.

Multipath signal reproduction unit 71 takes as input the received signals of reception antennas $14_1$-$14_N$, performs primary demodulation of the transmitted signals, uses the results to reproduce the multipath signals for each reception antenna and moreover for each multipath signal, and then provides the results to multipath interference elimination units $72_1$-$72_N$.

Various methods can be considered for the primary demodulation, and any demodulation method may be applied in the primary demodulation by multipath signal reproduction unit 71 of the present embodiment. As an example, there are primary demodulation methods that use MMSE or MLD as described in Document 2.

The demodulated signals may even be subjected to error correction decoding, whereby the reliability of the multipath reproduction signals can be further improved.

A method may further be considered in which configurations composed of multipath signal reproduction and interference elimination are connected in a multiplicity of stages to repeat the process and thus raise the reliability of the multipath reproduction signals.

Multipath interference elimination units $72_1$-$72_N$ eliminate multipath interference for each of reception antennas $14_1$-$14_N$, and moreover, for each path.

The received signal $r_{n,l}(t)$ after elimination of multipath interference for path l of reception antenna n is found by subtracting multipath interference other than that of path l from received signal $r_n(t)$, as shown in Equation (26)

$$r_{n,l}(t) = r_n(t) - \sum_{l'=0, l' \neq l}^{L-1} I_{n,l'}(t - \tau_{l'}). \tag{26}$$

Here, $\tau_r$ indicates the timing of path l, and $l_{n,l}(t-\tau_r)$ indicates the multipath signal of all transmission antennas of path l.

Despreaders $21_{11}$-$21_{NL}$ take as input the received signals from which multipath interference has been eliminated by multipath interference elimination units $72_1$-$72_N$ and carry out despreading for each reception antenna and for each path.

Transmission channel estimation unit 22 takes as input the received signals from which the multipath interference has been cancelled and uses the known pilot that is contained in the received signals to estimate the transmission channel estimation values between the transmission and reception antennas for each path. In the present embodiment, transmission channel estimation unit 22 may also directly use the received signals of reception antennas $14_1$-$14_N$ without using signals from which the multipath interference has been eliminated, but in such a case, the accuracy of the transmission channel estimation is degraded.

Rake combining unit 23 uses the transmission channel estimation values produced by transmission channel estimation unit 22 to perform optimum rake combining of the multipath signals for each transmission antenna.

Whitening filter calculation unit 24 calculates coefficients for the whitening filter (linear filter) based on the transmission channel estimation values.

Whitening filter 25 filters signal vector z that has undergone rake combining by rake combining unit 23 to find signal z' in which noise has been whitened.

MLD unit 26 uses transmission channel matrix H and whitening filter matrix D to generate reception replicas for all transmission antenna signals, calculates the error signals between the reception replicas and each signal of signal vector z, and selects the most likely transmission antenna signal.

As described in the foregoing explanation, in a configuration according to the present embodiment, in which the results of first subjecting CDMA received signals to demodulation are used to reproduce multipath signals and signals, in which multipath interference has been cancelled from these multipath signals, then used to implement rake combining and an MLD process, the remaining multipath interference following cancellation of the interference that affects each path differs and an excellent signal separation characteristic can therefore be obtained regardless of differences in multipath signal levels.

Finally, configurations have been shown in the above-described embodiments in which linear combining of multipaths is carried out by means of rake combining, MMSE or ZF, whereby a superior signal separation characteristic can be obtained regardless of differences in levels between multipaths. However, the present invention is not limited to these rake combining and MMSE and ZF methods, and any configuration of multipath linear combining can be applied.

While preferred embodiments of the present invention have been described using specific terms, such description is for illustrative purposes only, and it is to be understood that changes and variations may be made without departing from the spirit or scope of the following claims.

What is claimed is:

1. A MIMO receiver for receiving signals that have been transmitted from a plurality of transmission antennas by means of a plurality of reception antennas, comprising:
   a multipath linear combining unit for performing linear combining of multipaths in the received signals of said reception antennas by means of a transmission channel matrix between said plurality of transmission antennas and said plurality of reception antennas; and
   a maximum likelihood detector for comparing the signals in which said multipaths have been combined by said multipath linear combining unit with reception replicas that have been found using said transmission channel matrix to estimate the transmission signals of each of said transmission antennas,
   wherein the transmission channel matrix incorporates an influence of multipath noise interference power,
   wherein the MIMO receiver further comprises a whitening filter for whitening noise in signals in which said multipaths have been combined by said multipath linear combining unit and providing the result to said maximum likelihood detector,
   wherein the maximum likelihood detector comprises:
   a transmission symbol candidate generation unit which generates a transmission symbol vector;
   a replica generation unit which generates the replication replicas using said transmission symbol vector and said transmission channel matrix;
   an error calculation unit which calculates error signals corresponding to each of said transmission antennas by comparing the signals in which noise has been whitened and the replication replicas; and
   a bit likelihood calculation unit which receives the error signals corresponding to each of said transmission antennas and calculates a transmission likelihood for each bit transmitted from each of said transmission antennas.

2. A MIMO receiver according to claim 1, wherein said maximum likelihood detector performs calculations for estimates in which the calculation load is reduced by using the results of QR decomposition of said transmission channel matrix.

3. A MIMO receiver according to claim 1, wherein said multipath linear combining unit uses said transmission channel matrix to perform rake combining of multipaths of said reception antennas for each of said transmission antennas.

4. A MIMO receiver for receiving signals that have been transmitted from a plurality of transmission antennas by means of a plurality of reception antennas, comprising:
   a multipath linear combining unit for performing linear combining of multipaths in the received signals of said reception antennas by means of a transmission channel matrix between said plurality of transmission antennas and said plurality of reception antennas; and
   a maximum likelihood detector for comparing the signals in which said multipaths have been combined by said multipath linear combining unit with reception replicas that have been found using said transmission channel matrix to estimate the transmission signals of each of said transmission antennas,
   wherein the transmission channel matrix incorporates an influence of multipath noise interference power,
   wherein said multipath linear combining unit uses equalizing weights obtained from said transmission channel matrix according to a Minimum Mean Square Error method or a ZF method to perform equalizing of multipaths of said reception antennas for each of said transmission antennas.

5. A MIMO receiver for receiving signals that have been transmitted from a plurality of transmission antennas by means of a plurality of reception antennas, comprising:
   a multipath linear combining unit for performing linear combining of multipaths in the received signals of said reception antennas by means of a transmission channel matrix between said plurality of transmission antennas and said plurality of reception antennas; and
   a maximum likelihood detector for comparing the signals in which said multipaths have been combined by said multipath linear combining unit with reception replicas that have been found using said transmission channel matrix to estimate the transmission signals of each of said transmission antennas,
   wherein the transmission channel matrix incorporates an influence of multipath noise interference power
   wherein the MIMO receiver further comprises, before said multipath linear combining unit:
   a multipath signal reproduction unit for performing tentative demodulation of the transmitted signals of each of said transmission antennas from the received signals of said reception antennas, and using the obtained results to reproduce multipath signals that have been received by said reception antennas; and
   a multipath interference elimination unit for using said multipath signals that have been reproduced by said multipath signal reproduction unit to eliminate multipath interference from signals that have been received by said reception antennas.

6. A MIMO receiver according to claim 5, wherein said multipath signal reproduction unit uses a Minimum Mean Square Error method in said tentative demodulation.

7. A MIMO receiver according to claim 5, wherein said multipath signal reproduction unit uses maximum likelihood detection in said tentative demodulation.

8. A MIMO receiver according to claim 5, wherein said multipath signal reproduction units and said multipath interference elimination units are connected in plural stages.

9. A MIMO reception method for receiving signals that have been transmitted from a plurality of transmission antennas by means of a plurality of reception antennas; said MIMO reception method comprising:
   performing linear combining of multipaths in received signals of said reception antennas by means of a transmission channel matrix between said plurality of transmission antennas and said plurality of reception antennas; and
   estimating the transmitted signals of each of said transmission antennas by comparing signals in which said multipaths have been combined with reception replicas found by using said transmission channel matrix,
   wherein the transmission channel matrix incorporates an influence of multipath noise interference power,
   wherein the method further comprises, before performing linear combining of multipaths in received signals of said reception antennas,:
   performing tentative demodulation of transmitted signals of each of said transmission antennas from received signals of said reception antennas, and using the obtained results to reproduce multipath signals that have been received by said reception antennas; and using said multipath signals that have been reproduced to eliminate multipath interference from signals that have been received by said reception antennas.

10. A MIMO radio communication system comprising:
a MIMO receiver according to claim 1; and
a MIMO transmitter that is provided with said plurality of transmission antennas for transmitting signals from each of said transmission antennas.

11. The MIMO receiver of claim 1, further comprising a whitening filter calculation unit which calculates a coefficient of the whitening filter for whitening noise in signals.

12. The MIMO receiver of claim 4, further comprising an equalizing weight calculation unit which calculates the equalizing weights using said transmission channel matrix.

* * * * *

UNITED STATES PATENT AND TRADEMARK OFFICE
CERTIFICATE OF CORRECTION

PATENT NO. : 8,036,295 B2
APPLICATION NO. : 11/441199
DATED : October 11, 2011
INVENTOR(S) : Shousei Yoshida It is certified that error appears in the above-identified patent and that said Letters Patent is hereby corrected as shown below:

In the Specification

Column 2, Line 45: delete "$9_{11}$-$91_N$," and insert -- $91_1$-$91_N$, --

Column 3, Line 35: delete "Λto" and insert -- Λ to --

Column 3, Line 37: delete "$r_{n,l}$" and insert -- $\tilde{r}_{n,l}$ --

Column 4, Line 44: delete "($Q^H Q=_1$)," and insert -- ($Q^H Q=1$), --

Column 11, Line 34: delete "($Q^H Q=I$)," and insert -- ($Q^H Q=1$), --

Signed and Sealed this
Fifteenth Day of July, 2014

Michelle K. Lee
*Deputy Director of the United States Patent and Trademark Office*